F. MESSMER, Jr.
VALVE.
APPLICATION FILED MAR. 28, 1910.

979,874.

Patented Dec. 27, 1910.

Witnesses:
Chas. A. Becker,
George G. Anderson.

Inventor:
Ferdinand Messmer, Jr.
By Hugh K. Wagner
His Attorney

UNITED STATES PATENT OFFICE.

FERDINAND MESSMER, JR., OF ST. LOUIS, MISSOURI.

VALVE.

979,874.      Specification of Letters Patent.      Patented Dec. 27, 1910.

Application filed March 23, 1910. Serial No. 551,141.

*To all whom it may concern:*

Be it known that I, FERDINAND MESSMER, Jr., a citizen of the United States, residing at the city of St. Louis, State of Missouri, have invented certain new and useful Improvements in Valves, of which the following is a specification, reference being had therein to the accompanying drawings.

This invention relates to valves, and has for its object to provide a valve having certain novel means for preventing leakage of gas or liquid therefrom when the plug or other parts of the valve become worn.

Figure 1:
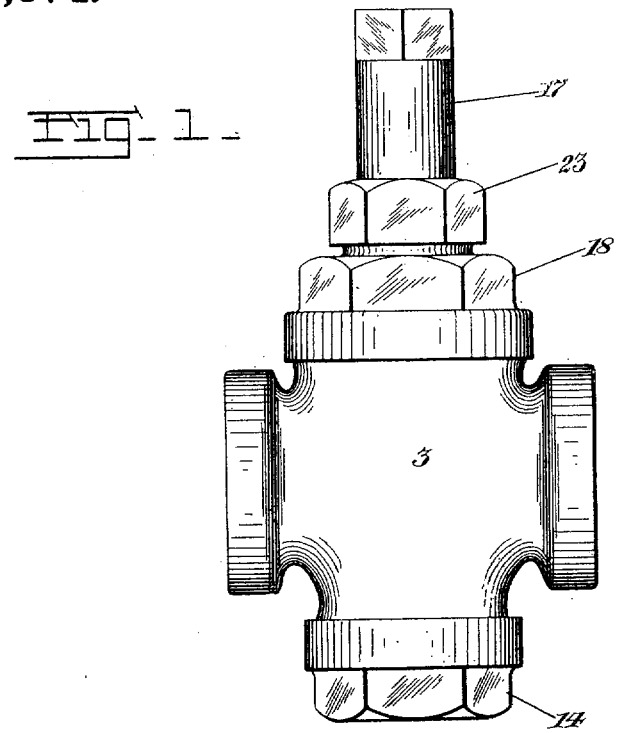
Figure 2:
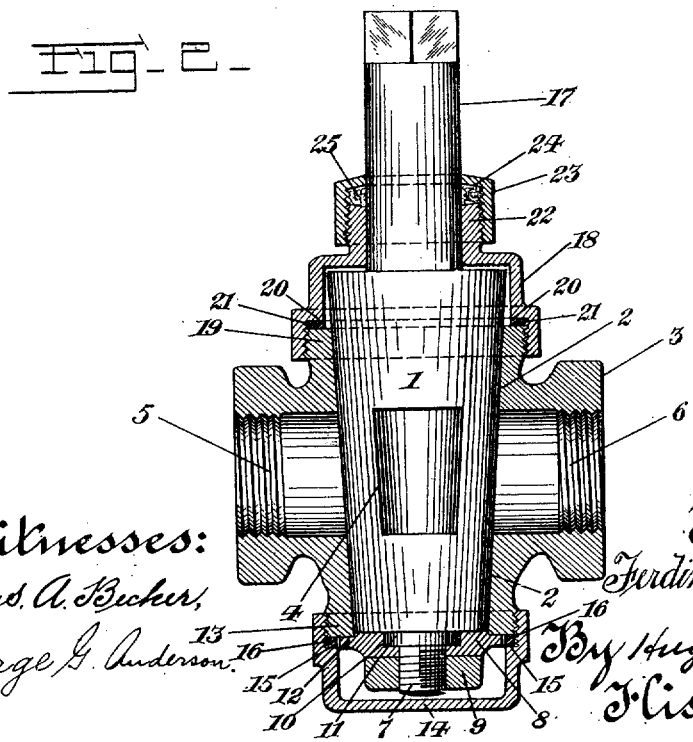

In the drawings forming part of this specification in which like numbers of reference denote like parts wherever they occur, Figure 1 is a front elevation of a valve embodying this invention, and Fig. 2 is a longitudinal sectional view of the valve depicted in Fig. 1.

The plug 1, which is preferably tapered, is revolubly mounted in an opening 2 in casing 3 and is provided with an opening 4 in order to allow the gas or liquid to flow therethrough when said plug is turned so that said opening communicates with inlet 5 and outlet 6 of said casing, but when said plug is turned so that said opening does not communicate with said inlet and said outlet, the gas or liquid is prevented from flowing through said casing. The inlet 5 and the outlet 6 are preferably screw-threaded to afford a means for connecting the casing 3 to the pipes (not shown in the drawings).

A screw-threaded pin 7 projects from the lower end of plug 1 and receives a washer 8 that is held firmly against the lower end of said plug by means of a nut 9, said washer being recessed at 10 to receive a projection 11 borne by the lower end of said plug. Said washer 8 is provided with a flange 12 which overlaps part of flange 13 on the bottom of said casing. Flange 13 is screw-threaded externally to receive a screw-threaded cap 14, a portion of the outer surface of said cap being angular to facilitate the turning of same. An offset 15 projects from the inner surface of cap 14 and forms a seat for a packing washer 16 which is held tightly against the bottom of casing 3 and which encircles washer 8. If the plug 1 or washer 8 becomes worn so that the gas or liquid is allowed to escape into cap 14, the washer 16 prevents the gas or liquid from leaking out of said cap.

The upper end of plug 1 extends preferably above the top of casing 3 and bears a stem 17, the end of said stem being angular to afford a means by which said stem can be gripped with a key or lever (not shown in the drawings) for the purpose of turning same. A cap 18 is screw-threaded internally to fit on the screw-threaded flange 19 at the top of casing 3, a portion of the outer surface of said cap being angular to aid in turning same. An offset 20 projects from the interior surface of cap 18 and presses a packing washer 21 tightly against the top of said casing in order to prevent the gas or liquid from leaking out of cap 18 when plug 1 becomes worn so that same allows the gas or liquid to enter said cap. A sleeve 22 borne by cap 18 encircles stem 17 and is screw-threaded externally to receive a screw-threaded cap 23 that, also, encircles said stem, the outer surface of said cap 23 being preferably angular. The sleeve 22 is shorter than the side of cap 23 so that, when said cap is screwed on said sleeve, a space or stuffing-box 24 around stem 17 is left between the end of said cap 23 and the end of said sleeve. Packing 25 is placed in said stuffing-box in order to prevent the gas or liquid from escaping around stem 17.

For the purpose of illustration a two-way valve has been depicted in the drawings, but it should be understood that this invention is applicable to three-way or four-way valves, or to valves having more than four ways.

I claim:

1. A valve including a casing, a plug therefor having a stem, a projection borne by the lower end of the plug of less diameter than the latter, a screw threaded pin projecting outwardly from said projection, a washer formed with a recess to receive said projection and with an opening to receive said pin, said washer abutting the lower end of the plug and having a flange which engages the bottom of the casing, a cap secured to the bottom end of the casing and formed with an internal offset, a packing washer encircling the said first named washer abutting the bottom end of the casing and being seated on said offset, and a nut on said screw threaded pin bearing against the outer end of the first named washer.

2. A valve including a casing, a plug therefor having a stem, a projection borne by the lower end of the plug of less diameter than the latter, a screw threaded pin projecting outwardly from said projection, a washer formed with a recess to receive said projection and with an opening to receive said pin, said washer abutting the lower end of the plug and having a flange which engages the bottom of the casing, a cap secured to the bottom end of the casing and formed with an internal offset, a packing washer encircling the said first named washer and being seated on said offset, a nut on said screw threaded pin bearing against the outer end of the first named washer, the upper end of said plug extending above the top of the casing, a second cap secured to the top end of the casing, said cap being formed with an interior offset, a packing washer seated on the top end of the casing and surrounding said upper end of the plug, and being engaged by said offset of the cap, a sleeve borne by the cap and encircling said stem, packing surrounding the stem and seating on the top end of said sleeve and a third cap secured to said sleeve receiving said stem and pressing on top of said packing.

3. A valve including a casing, a plug therefor, said plug being formed at its lower end with a projection and a threaded pin extending outwardly therefrom, a washer received over said pin and recessed to receive said projection and abutting the bottom end of the plug, a packing washer abutting the bottom end of the casing and encircling the periphery of said first named washer, a nut threaded on said pin and projecting against the outer end of said washer, and means inclosing said nut, washer, and the packing washer, said means being formed to support the packing washer against movement and being further formed for attachment to the casing.

4. A valve comprising a casing, a plug therefor, a stem borne by the plug, a washer seating on the upper end of the casing, and below the top end of the plug, a cap secured to the casing and seating on the washer, said cap extending over the top end of the plug and encircling the stem, and a stuffing box carried by the cap above the top end of the plug.

In testimony whereof I have affixed my signature in presence of two witnesses.

FERDINAND MESSMER, Jr.

Witnesses:
   GEORGE G. ANDERSON,
   GLADYS WALTON.